(No Model.)

W. D. WHALEN.
ELECTRIC SPRING CLOCK.

No. 259,066. Patented June 6, 1882.

Attest:
A. Barthel
Charles J. Hunt

Inventor:
Walter D. Whalen
per Rhs. S. Sprague
Att'y

UNITED STATES PATENT OFFICE.

WALTER D. WHALEN, OF HOWELL, MICHIGAN.

ELECTRIC SPRING-CLOCK.

SPECIFICATION forming part of Letters Patent No. 259,066, dated June 6, 1882.

Application filed December 1, 1881. (No model.)

*To all whom it may concern:*

Be it known that I, WALTER D. WHALEN, of Howell, in the county of Livingston and State of Michigan, have invented an Improvement in Electric Spring-Clocks, of which the following is a specification.

The nature of this invention relates to certain new and useful improvements in the construction of that class of clocks wherein electricity is applied for the purpose of automatically winding the spring thereof at each beat or half-beat of the pendulum, and thereby retaining the same tension of the spring at all times, excepting so much as is given off at each pulsation of the pendulum; and the invention consists in the peculiar construction, arrangement, and various combinations of the parts for effecting the desired result, all as more fully hereinafter set forth.

Figure 1:
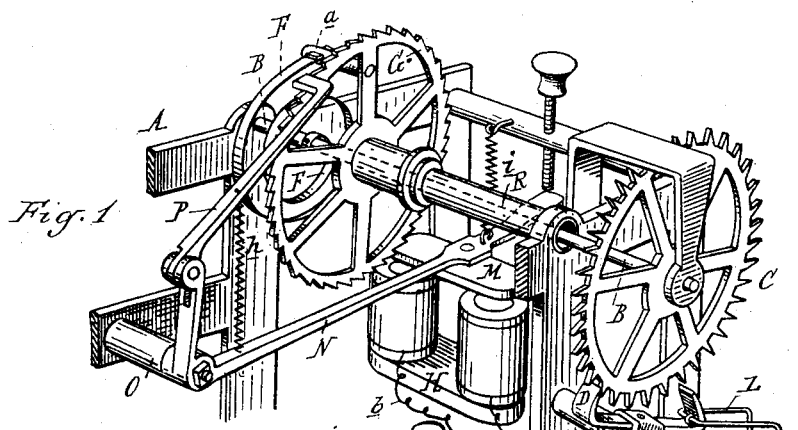
Figure 2:
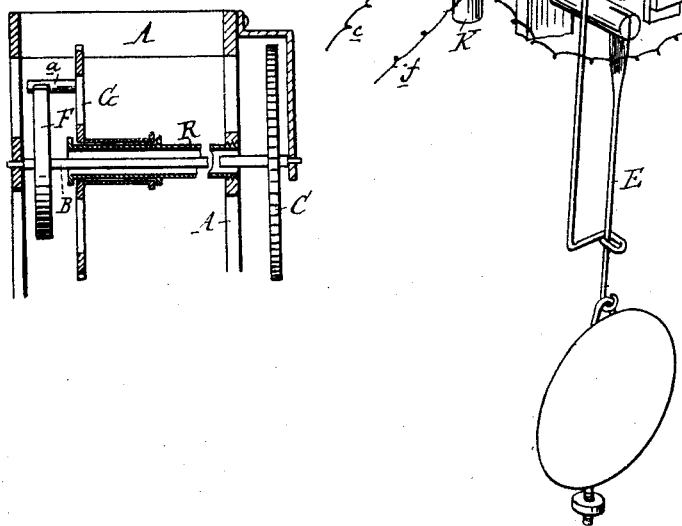

Figure 1 is a perspective view representing one manner of applying my invention to a clock. Fig. 2 is a vertical section.

In the accompanying drawings, which form a part of this specification, A represents the clock frame-work which supports and carries the operating parts. Transversely across this frame I properly journal, as is customary in such structures, the shaft or arbor B, the outer end of which carries the escape-wheel C, which engages with the verge D, operated by the beating of the pendulum E, as in the ordinary manner. Near the rear end of the arbor B, I rigidly secure one end of the coil-spring F, the opposite end of which is secured to a stud, *a*, which projects from the side of a ratchet-wheel, G, which is sleeved upon the arbor B in such manner that said ratchet-wheel will rotate without having any frictional bearing or contact upon or with the arbor. This is accomplished by the use of a sleeve, R, screwed into or otherwise secured to one side of the frame, so as to allow the free passage of the arbor B, and yet form a firm bearing for the wheel G, as clearly shown in Fig. 2.

H represents an electro-magnet secured suitably within the frame A, as shown, which is connected by means of the wires *b* to the post I, from which the wire *c* runs to any suitable battery. Another wire, *d*, running from said electro-magnet, connects with one of the mercury-cups, J, while a wire, *e*, connects the other mercury-cup with the post K, which in turn is connected to the battery by the wire *f*. A forked yoke, L, is insulated and rigidly secured to the verge D, and is bent downwardly, so that the ends of such yoke L will enter the mercury-cups and come in contact with the mercury contained therein, so that at each vibration of the verge or pendulum the circuit will be complete between the battery and the electro-magnet through the connecting-wires, yoke, and mercury-cups. As this circuit is intermittingly made and broken by the pulsation or vibration of the verge the electro-magnet attracts to it at each completion of the circuit the armature M, which is secured to one arm of the bell-crank lever N, which is properly journaled at its angle to a stud, O, projecting from the frame. The shorter arm of this bell-crank lever N is provided with a dog or pawl, P, which engages with the teeth of the ratchet-wheel G, such engagement being caused through the medium of the spring *h*, while the armature M is retracted or drawn from the face of the electro-magnet at the breaking of the circuit through the medium of a suitable spring, *i*.

It can readily be seen that a clock constructed substantially in the manner shown must be positive in its action and continuous therein so long as the battery has a sufficient power to perform its function, while at the same time a battery employed having a much greater power than is required can in no way affect the positive and regular operation of the parts. In the illustration given the ratchet-wheel G is provided with an equal number of teeth with the crown or escapement wheel, and in the operation, as the escapement and crown wheel in the beating of the pendulum must necessarily cause the spring F to give off one beat of its strength or motive power, the connections herein named must necessarily cause the ratchet-wheel G, which holds the outer end of said spring, to wind the same up, the said one beat of the pendulum thereby necessarily retaining a uniform tension upon the spring at all times. Where the pendulum is designed to beat seconds there must necessarily be double the number of teeth in the ratchet-wheel that there are in the escape, and the verge provided with a yoke similar to L, so as to open and close the circuit at each beat of the pendulum, or, in other words, at each and every time that the pendulum attains the limit of its oscillation upon either side of a perpendicular line through the point of suspension of the pendulum.

It will further be seen in this construction of a clock that the employment of the ordinary train of gearing, such as is used in all spring or weight clocks, or, in fact, all clocks, is entirely dispensed with, and that I necessarily materially lessen the cost in manufacture of clocks of the better class, which are designed for time-keepers, wherein such train of gear must necessarily be accurately made and well finished, while at the same time the spring, in my construction, being automatically wound as described, must exert a force upon its arbor equal and uniform, as in clocks which are run by springs or weights. As the gear employed for operating the hands of the clock forms no part of my invention, I make no illustration or reference thereto.

I am aware that various attempts have been made to construct so called "electrical clocks" wherein the electricity has been applied in such a manner as to attract or repulse the pendulum in its operation, but such have proved almost utter failures as correct time-keepers, as they will run fast or slow as the battery is stronger or weaker.

I am also aware that it is not new to apply electricity for the purpose of automatically winding a spring secured to the escapement-arbor at each beat of the pendulum, and I do not claim broadly such construction.

What I claim is—

1. The combination, with the arbor B, carrying an escapement-wheel, the spring F, the magnet H, bell-crank N, armature M, pawl P, and a circuit-breaker, of the ratchet-wheel G, mounted on a stationary sleeve, R, adapted to allow the free passage and movement of the arbor B, substantially as and for the purpose specified.

2. The combination, with the escapement C, arbor B, ratchet-wheel G, spring F, pawl P, bell-crank N, armature M, magnet H, and a circuit-breaker, of the supporting-frame A, and the sleeve R, secured to the frame, said sleeve forming a bearing for the ratchet-wheel G, and forming a free passage for the arbor B, substantially as and for the purpose specified.

3. The combination, with the escapement-wheel C, of the arbor B, the ratchet-wheel G, the spring F, secured at its ends to said arbor and ratchet-wheel, the pawl P, the bell-crank and armature M N, the electro-magnet H, the verge D, the bent yoke L, connected to and moving with the verge, the double mercury-cup J, and electrical connections between the electro-magnet and the mercury-cup, substantially as described.

WALTER D. WHALEN.

Witnesses:
H. S. SPRAGUE,
CHAS. J. HUNT.